United States Patent [19]

Martin et al.

[11] Patent Number: 4,919,370

[45] Date of Patent: Apr. 24, 1990

[54] CABLE FITTING

[76] Inventors: William B. Martin, 772 Twin View Pl., Pleasant Hill, Calif. 94523; John W. Martin, 743 Santa Anna Dr., Pittsburgh, Calif. 94565; Mark Bryan, 110 S. Cornish Ave., Lodi, Calif. 95242

[21] Appl. No.: 311,750

[22] Filed: Feb. 17, 1989

[51] Int. Cl.⁵ .............................................. F16L 5/00
[52] U.S. Cl. ....................................... 248/56; 248/73; 24/129 R; 174/153 G
[58] Field of Search ................. 248/56, 68.1, 73, 74.1, 248/221.4, 316.1; 24/129 D, 122.6, 129 R; 174/153 G; 16/2; 439/459, 460, 470

[56] References Cited

U.S. PATENT DOCUMENTS

| | | |
|---|---|---|
| 3,424,856 | 1/1969 | Coldren . |
| 3,493,205 | 2/1970 | Bromberg . |
| 3,562,847 | 2/1971 | Jemison ............................ 248/56 |
| 3,564,113 | 2/1971 | Kindler . |
| 3,991,446 | 11/1976 | Mooney ............................ 411/548 |
| 4,000,875 | 1/1977 | Jemison ....................... 174/153 G |
| 4,056,252 | 11/1977 | Simon ................................ 248/56 |
| 4,142,064 | 2/1979 | Thomsen ..................... 174/153 G |
| 4,188,003 | 2/1980 | Ramsey ....................... 174/153 G |
| 4,190,222 | 2/1980 | Appleton ............................. 248/56 |
| 4,262,409 | 4/1981 | Madej ............................... 29/526 |
| 4,299,363 | 11/1981 | Datschefski . |
| 4,350,839 | 9/1982 | Lass ................................. 174/65 |
| 4,361,302 | 11/1982 | Lass ................................. 248/56 |
| 4,366,343 | 12/1982 | Slater et al. ..................... 174/65 |
| 4,474,489 | 10/1984 | Simon ............................... 248/56 |

FOREIGN PATENT DOCUMENTS

| | | | |
|---|---|---|---|
| 2316747 | 10/1974 | Fed. Rep. of Germany ... | 174/153 G |
| 2700389 | 7/1978 | Fed. Rep. of Germany ... | 174/153 G |
| 2295287 | 7/1976 | France ................................ | 248/56 |
| 152065 | 10/1955 | Sweden ............................... | 248/56 |

*Primary Examiner*—Ramon O. Ramirez
*Assistant Examiner*—Robert A. Olson
*Attorney, Agent, or Firm*—Wigman & Cohen

[57] ABSTRACT

The present invention is directed to a cable fitting for insertion in a protective enclosure. The fitting includes a plurality of cable channels and is constructed of a first staging portion for attachment to the electrical enclosure and a second portion which incorporates strain relief features with gripping teeth for clamping the cable. The fitting is designed for use with one or two cables. In use, it is installed in the enclosure to the staging position depth, the cables are inserted through the fitting via the cable channels into the box to the desired position for clamping, and the fitting is driven to the installed position to lock the fitting to the box and the cable within the fitting. The fitting may also be fully inserted and the cables installed thereafter.

24 Claims, 3 Drawing Sheets

CABLE FITTING

FIELD OF THE INVENTION

The present invention is directed to a cable fitting for securing at least one cable, such as non-metallic (NM) sheath conductor cable through an aperture in the wall of a protective enclosure. More specifically, the present invention is generally directed to inexpensive, labor-saving protective cable fittings for inserting and securing at least one and preferably two electrical or other cables into the protective enclosure. When fully installed, the cables may not easily be withdrawn from the protective enclosure.

BACKGROUND OF THE INVENTION

Insulating bushings and interconnection box cable connecting fittings are well known in the prior art, as illustrated by U.S. Pat. Nos. 2,948,973 to Hawes; 3,424,856 to Coldren; 3,991,446 to Mooney et al; 4,299,363 to Datschefski; 4,474,489 to Simon; and particularly 3,493,205 to Bromberg. The Hawes, Coldren, Mooney et al, Datschefski, Simon, and Bromberg patents are all directed to bushing or fitting devices for installing and securing single sheathed cables to an electrical enclosure box. The sheathed cables may each comprise a plurality of conductors and typically may include an outer plastic protective shield. None of these prior art fittings or bushings are specifically designed for safely securing two or more cables, such as nonmetallic sheathed cables, to the electrical enclosure box. None provide a plurality of generally rectangular channels, each for housing one or more cables.

SUMMARY OF THE INVENTION

The present invention overcomes the single-cable limitations noted above with respect to the prior art devices by providing a cable fitting device having strain relief features which can be readily installed to connection box enclosures and includes provision for multiple, as well as single cable attachment and strain relief. An example of a cable which may be advantageously installed in a connection box enclosure is conventional nonmetallic circuit wiring commonly found in house wiring circuits. Connection box enclosures are normally provided with preformed apertures, or have pre-punched "knockouts", easily removed with hand tools and providing entry apertures for insertion of the cables through the enclosure wall. Conventionally, a fitting or box connector is provided which mechanically protects and facilitates securing each of the cables entering the enclosure.

Basically, the fitting according to the present invention is formed of a unitary, generally tubular element having a main passageway therethrough for receiving one, two, or more cables on either side of at least one centrally disposed divider element subdividing the main passageway into two or more channels for the cables. One channel is preferably dedicated for each cable, however, not all of the channels necessarily need be occupied by cable. Individual channels may include plural cables. The fitting may be generally spool-shaped. In the present preferred embodiment, modifications from a circular spool shape have been dictated by manufacturing considerations. The spool has a plurality of longitudinally extending, at least partially arcuate arms terminated with radially outward extending lips or tabs on the exterior thereof. Lip or flange stop faces are provided for limiting the final insertion depth of the fitting into the enclosure or panel. The arms are provided with outer first, second, and third tapered shoulder areas for sliding contact with the circumferential rim of the knockout in the box enclosure or panel. The arms are provided with cable gripping elements for gripping the exterior insulation or jacket of the cables passing through the spool. Flexure of the arms near their juncture with the fitting housing permits a camming action of the gripping arms against the anvil. This camming action results when the cable is withdrawn from the fitting, and ensures a positive gripping of the cable against the longitudinal divider.

Insertion of the fitting into the enclosure past the first shoulder to a first, staging position permits insertion of cable into the enclosure via the passageway. If the fitting or connector is provided with one or more divider elements according to the present invention, one or more additional cables may be inserted, generally one per cable channel. Multiple cables per channel may be appropriate in some instances. Insertion of the fitting past the second shoulder up to the limiting flange, or to the second, locked position causes compression of the internal gripping element into gripping relationship with the cable or cables wherein the divider element or elements act as gripper anvils. Alternatively, the fitting may be inserted to the staging position, tapped into the second position, then the cable or cables may be inserted. The divider ends function as anvils to enhance the gripping of the cable. Retaining ears may be provided as positive anti-withdrawal stops to prevent removal of the fitting from the enclosure.

Other portions of the element housing are adapted to be struck or clamped to grip or engage the cable in the outermost portion of the enclosure. In one embodiment of the invention, the external portion of the fitting is adapted to provide a rear-end striking surface. In a further embodiment of the invention, one or more rearward facing screwdriver slots are provided to enable driving the fitting securely into the box with a screwdriver, such as an ordinary electrician's screwdriver. In yet another embodiment of the invention, the fitting may be affixed to the enclosure or panel and locked by compression of the gripping arms, such as provided by an ordinary pair of channelled adjustable pliers. In an alternative embodiment, a plurality of retaining ears are provided which may be clamped together for insertion of the fitting through the enclosure wall and then released when the fitting is fully inserted through the enclosure wall.

The fitting is constructed as a unitary, one-piece structure made of an insulating material, such as a plastic material. Preferably, the fitting is injection molded of plastic.

A first advantage of the invention is the provision of a cable fitting for securing multiple nonmetallic sheath cables to the enclosure box.

Another advantage of the present invention is the provision of an inexpensive, easily manufactured fitting having internal cable gripping features.

Yet another advantage of the invention is the provision of structure on the fitting which permits at least four separate methods for locking the fitting to the enclosure.

Other objects and advantages of the invention will be apparent from the following description and claims and are illustrated in the accompanying drawings, which disclose by way of example the principles of the invention and the best modes which are contemplated by the inventors for carrying them out.

BRIEF DESCRIPTION OF THE DRAWING FIGURES

The invention is disclosed in several drawing figures wherein the elements of the invention are identified by like reference numerals in all views.

DETAILED DESCRIPTION OF THE PREFERRED EMBODIMENTS

Figure 1:
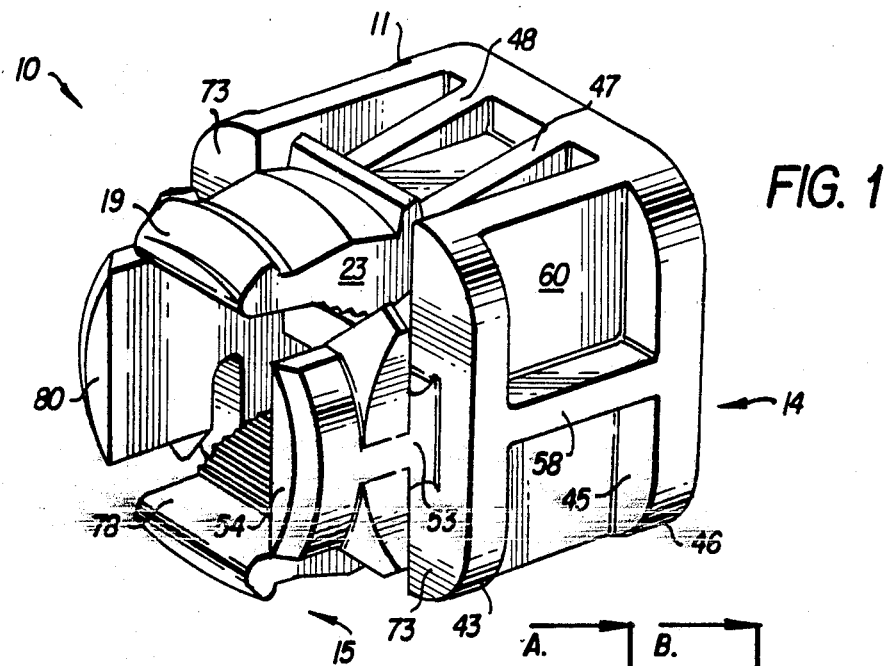
FIG. 1 is a perspective view of the fitting device of the present invention as viewed from the attachment or proximal end thereof.
Figure 2:
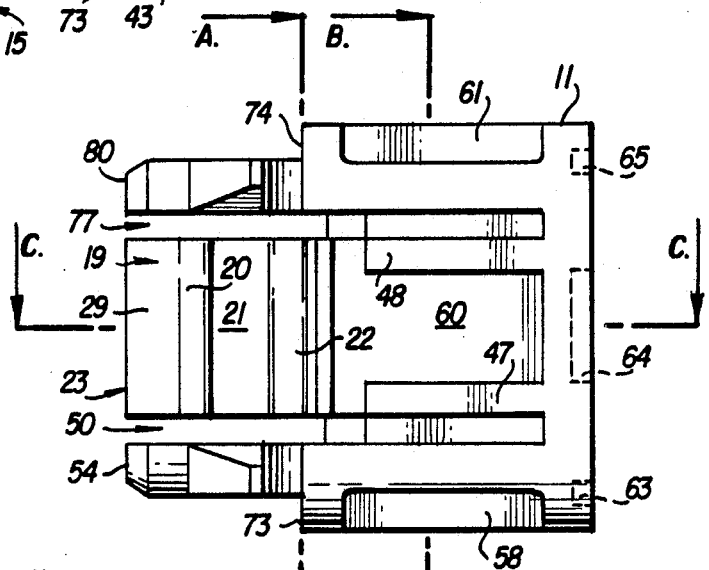
FIG. 2 is a plan view of the fitting invention with section lines A—A and B—B indicated.
Figure 3:
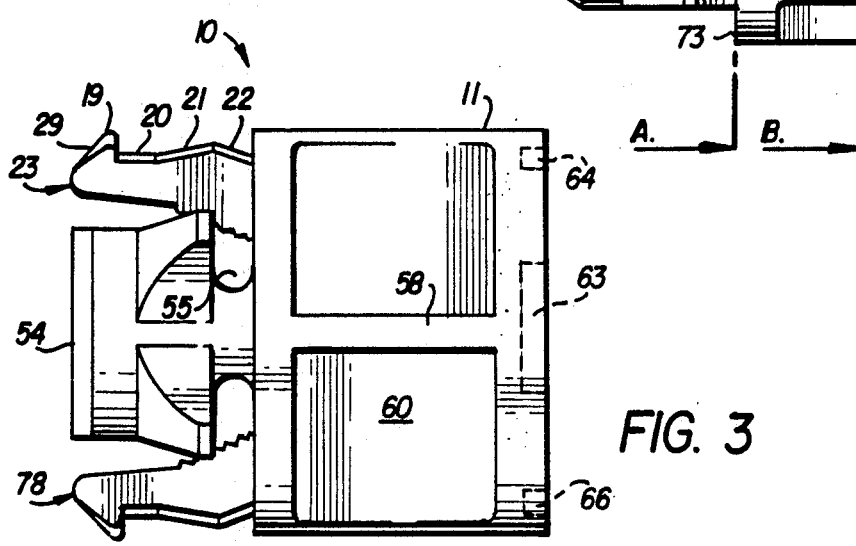
FIG. 3 is a side view of the fitting invention.

There is shown in FIGS. 1 through 11 a fitting or connector 10 constructed in accordance with the preferred embodiments of the present invention. From housing 11, a plurality of cantilevered arms 23, 78 extend longitudinally outward, including at their extreme ends first tabs or lips 19, which may be radially extending lips having tapered or sloped insertion faces 29 and stop or retaining faces 13 (FIG. 3). Housing 11 may be spool-shaped and have an elongated tubular central portion, or may be of such similar shape as is readily manufactured (such as by injection molding). The embodiment of FIGS. 1 through 11 has a generally rectangular cross-section with rounded corners for easy manufacture. The tabs or lips 19 may be arcuately curved along their insertion faces 29 to facilitate entry through a round aperture in a box enclosure. Housing 11 is adapted to receive cable at a first, distal wire entry end 14 and which cable exits fitting 10 at a wire exit or proximal end generally indicated by reference numeral 15.

Figure 8:
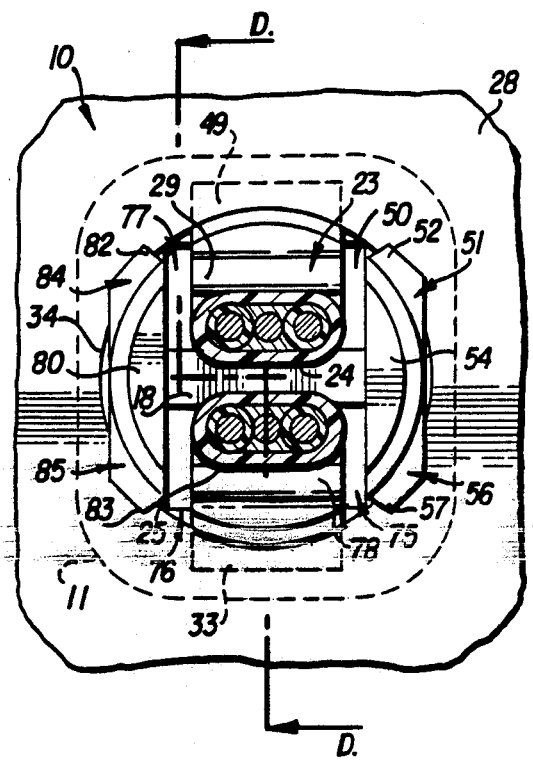
FIG. 8 is a proximal end view of the fitting invention containing a pair of conventional NM-type cables, as seen from inside the enclosure.

Arms 23, 78 may for the purposes of the illustrated example be comprised of two generally parallel faces displaced slightly from a plane through the central vertical axis of the device 10 as shown, and further may include a plurality of outward faces 20, 21, 22 (FIGS. 2 and 3) and interior face portions. The interior face portions may include a plurality of transverse serrations or gripping teeth 17. These interior face serrations or gripping teeth 17 engage the cables 24, 25 when the cables are withdrawn. More specifically, the articulable arms 23, 78 are positioned such that they contact cables 24, 25 by gripping teeth 17. Flexure of the arms permits them to rotate in a camming action into firmer gripping contact with the cables whenever the cables are withdrawn, individually or collectively. The arms are not short enough to permit them to pass through the central aperture, thus they lock the cable more tightly as the cable is withdrawn, resulting in a camming-lock action. In use the fitting 10 according to the invention secures at least one cable 25 (FIGS. 8 through 11) within housing 11 and to an enclosure 28 through, for example, a knockout aperture 34 in the enclosure 28 wall. FIG. 8 shows a pair of typical NM electrical cables 24, 25 installed in fitting 10 through an enclosure wall 28 via an aperture 34.

Figure 9:
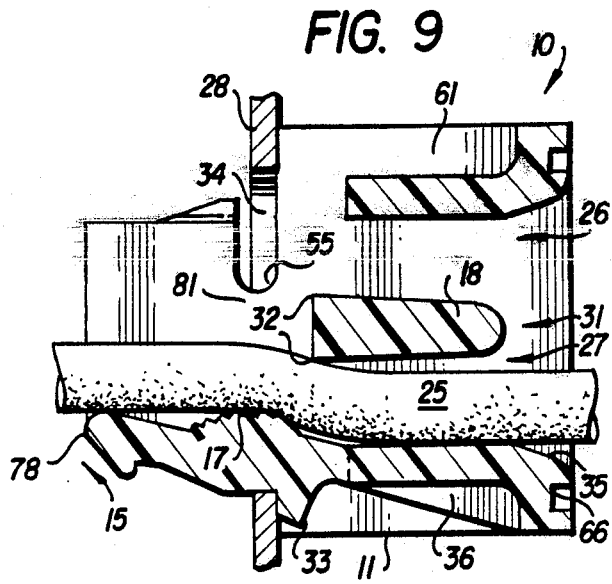
FIG. 9 is a cross section view of the fitting invention containing an NM cable taken at section line D—D.
Figure 10:
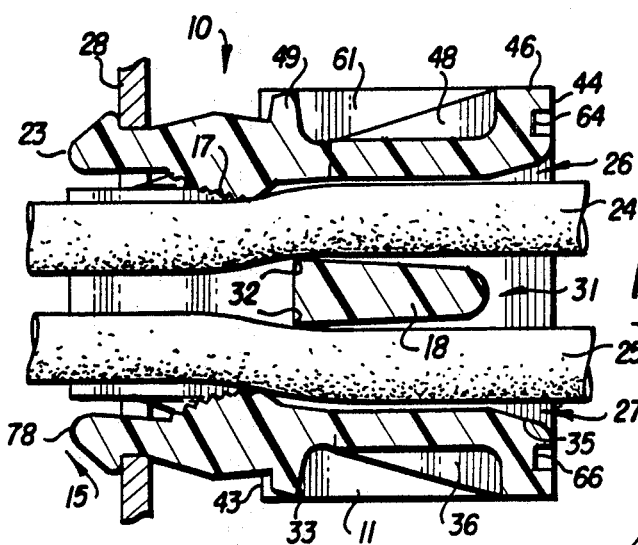
FIG. 10 is a sectional view of the fitting invention containing a pair of typical NM cables and installed into the enclosure to a first, or staging position taken at section line C—C.
Figure 11:
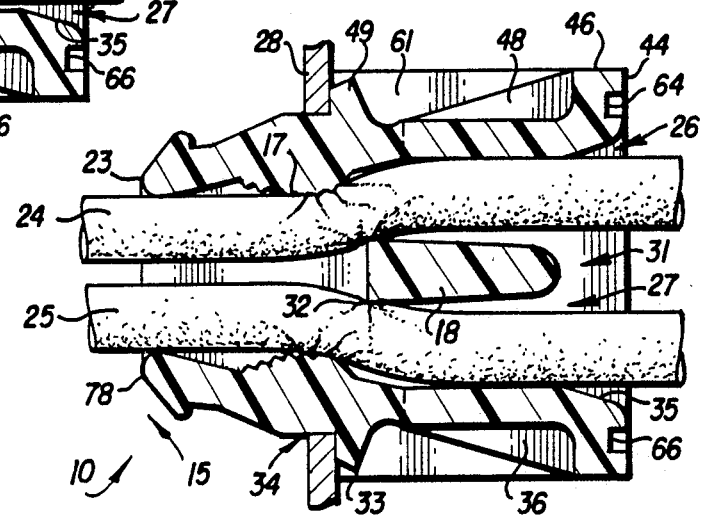
FIG. 11 is a sectional view of the fitting invention containing a pair of typical NM cables and installed into the enclosure to a second, or fully installed position taken at section line C—C.

Housing 11 incorporates a number of structural features, including fitting 10 special front and rear flanges 43, 46. Front flange 43 has a thickness dimension between front and rear surfaces 42, 41 (FIG. 1) and rear flange 46 has a thickness dimension between front and rear surfaces 45, 44 (FIG. 1). A central passageway 31 is formed by fitting 10 spool drum 60, which has a thickness dimension and may be round, a rounded square or rectangle, a (preferably regular) polygon or other suitable shape. Joining drum 60 and front and rear flanges 43, 46 together are a plurality of structural support members such as longitudinal members 58, 61. Member 61 is best seen in FIG. 2. The longitudinal members 58, 61 may be molded integral with and connect the front surface 45 of rear flange 46 to the rear surface 41 of front flange 43, as well as to the drum outer surface 60, and may also be formed of an insulating material. A thermal-plastic material may be preferred. Such materials include polyesters and polyolefins and particularly polyethylenes and polypropylene polymers. Flame retardant polyester or flame retardant polypropylene materials of the type meeting Underwriters' Laboratories Section 94-1 rating are preferred. Arms 23, 78 extend from inclined body longitudinal portions formed of similar support members. In the illustrative example described herein, a pair of inclined longitudinal members 47, 48, joined at least partially integral with surface 60 provide foundation and structural support for projecting arm 23. More particularly, inclined longitudinal support members 47, 48 are joined with a portion of rear flange 46 and drum surface 60. These portions form a reinforced structure which provides stiffness to arm 23 and also facilitates transfer of forces applied to housing 11 rear flange 46 rear surface 45 to projecting arms 23, 78. One of the bottom inclined longitudinal support members 36 forming a part of housing 11 and arm 78 is seen in FIGS. 9 through 11 at the bottom of housing 11.

Front flange 43 is divided around its periphery into substantially similar partial sections 73, 74 by arms 23, 78 and central passageway 31, in which sections 73, 74 are separated from top arm 23 by channels 50, 77. These channels in turn may extend slightly beyond the housing 11 front flange 43 into drum 60 at least partially towards rear flange 46. This combination enhances free cantilevered movement of arm 23. Similarly, a pair of like channels 75, 76 separate sections 73, 74 from arm 78 which lies therebetween at the bottom. Projecting frontwards from each of the front surfaces 73, 74 are notched retainer elements, generally attached to semilunar portions 54 and 80, which may be chamfered around the periphery thereof. Semilunar portions 54, 80 are joined to housing 11 front flange 43 respective sections 73, 74 front surfaces such as surface 42 by stems, such as stems 53, 81 (see FIGS. 2 and 9) adjacent the notches, illustrated by notch 55 (FIG. 9).

Figure 7:
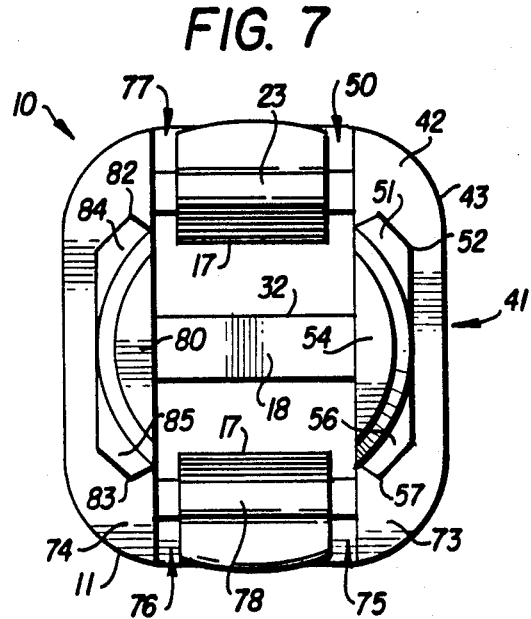
FIG. 7 is an end view of the fitting invention as seen from the front or proximal end of the device.

Extending rearward from semilunar portions 54, 80 are respectively left upper retaining tooth 82, left lower retaining tooth 83, and right upper and lower retaining teeth 52, 57 (see FIG. 7 and 8). These teeth 52, 57 and 82, 83 may have frontward facing sloped surfaces, best shown as surfaces 51, 56 on teeth 52, 57. By way of illustration, surfaces 51, 56 may be shaped to facilitate entry into an enclosure panel 28 aperture 34; the partial undercut at notch 55 (see FIGS. 3 and 9) from sections 73, 74 provides added flexibility during installation. Similar undercuts or notches underlie teeth 57, 82, and 83. Teeth 82, 83 face surfaces 84, 85 are best seen in FIG. 7. Teeth 52, 57, 82, 83 inhibit withdrawal of fitting 10 when it is fully installed. Note that semilunar portions 54, 80 can be sized so as to prevent easy insertion through apertures which are too small and can also be used to stabilize the fitting 10 during installation at the "staging" position, described hereinafter.

A plurality of grooves or notches 63, 64, 65, 66 (FIG. 6) in rear flange 46 surface 44 enable application of drive force, as by a screw driver or such equivalent tool.

Figure 4:
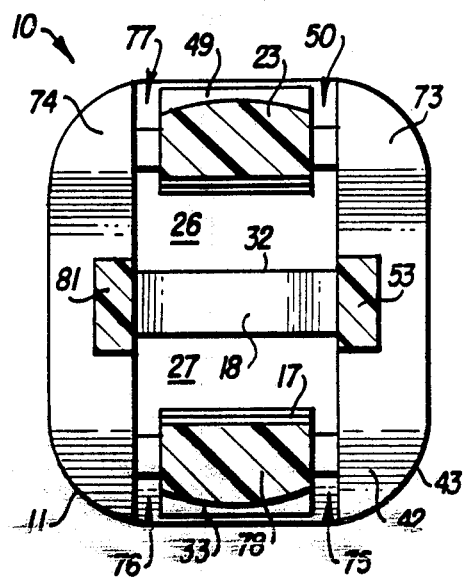
FIG. 4 is a cross-sectional view of the fitting invention taken at line A—A, and viewed towards the rear or distal end thereof.

From the proximal end 15 of fitting 10 (FIG. 3) a section A—A (in the lane of surface 42) is viewed in FIG. 4 towards distal end 14 of housing 11 of the fitting 10 according to the present invention. The squared spool-like shape (in this example) of housing 11 can be seen clearly in FIG. 4 with both front surface 42 of front flange 43 portions 73, 74 being shown surrounding the central passageway 31 (central passageway 31 is best viewed in FIGS. 9 through 11), which is divided into two channels 26, 27 in this illustrative example by divider 18. Divider 18 is partially sectioned in this view. Divider 18 terminates in an anvil 32; it is recessed behind plane A—A. Alternatively, stems 53 and 81 may be partially joined by an elongated divider 18 (not shown) for further strength and support if required.

Figure 5:
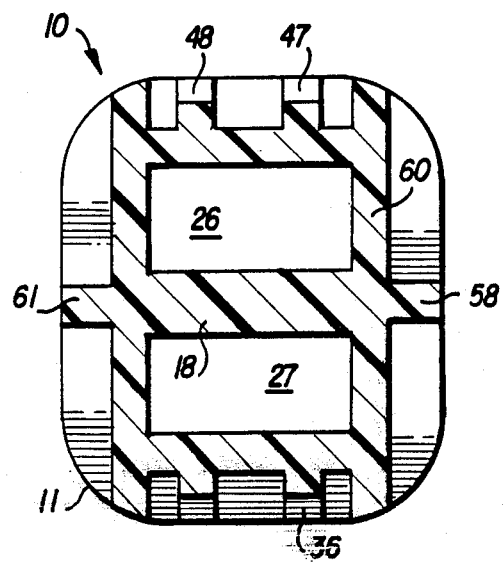
FIG. 5 is a cross-sectional view of the fitting invention taken at line B—B and viewed towards the rear or distal end thereof.

A further section B—B of the housing 11 is shown in FIG. 5. Interior details of the housing 11 according to the present invention are shown. Again, channels 50, 75, 76, 77 are shown adjacent arms 23, 78, separating the arms and also partially separating inclined members 47, 48 from the adjacent side portions of the spool drum 60. Divider 18, molded integral with drum 60 and longitudinal supports 58, 61 provides structural rigidity and helps maintain the integrity of housing 11. The central passageway 31 is divided into two channels 26, 27 bounded by drum 60, arms 23, 78, and divider 18.

Figure 6:
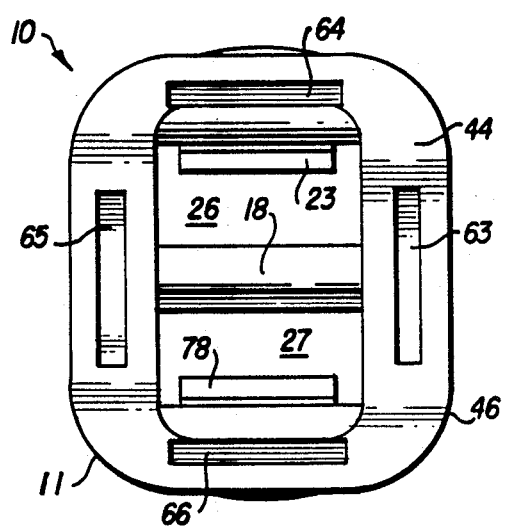
FIG. 6 is an end view of the fitting invention as seen from the rear or distal end of the device.

Viewed from the distal end 14 of housing 11 of the present invention fitting 10 as shown in FIG. 6, the drive notches 63, 64, 65, 66 are clearly visible in rear face 44 of rear flange 46. Also shown is the central passageway 31, as divided into two channels 26, 27 by divider 18. Interior portions of arms 23, 78 are visible, including one of the teeth 17 of the two arms 23, 78.

Visible in proximal end 15 view (FIG. 7) of housing 11 are respective left and right portions 73, 74 of flange 43, including the front surface 42 thereof (the rear surface 41 is seen in FIG. 2). Anvil 32 is shown terminating divider 18 (visible in FIG. 4) to separate the passageway 31 into first and second channels 26, 27.

Retaining teeth 52, 57, 82, and 83 are readily visible in FIG. 7 as are terminating sloped tooth face surfaces 51, 56, 84, 85, respectively. Also seen are channels 50, 75, 76, 77, dividing the flange portions 73, 74 along sides or arms 23, 78.

Taking a vertical longitudinal split sectional view along line D—D of FIG. 8 provides a view such as FIG. 9, which is further explained in detail in combination with FIGS. 10 and 11. The main passageway 31 is seen at distal end 14; it is split into channels 26, 27 by divider 18, the termination of which functions as an anvil in cooperation with gripper teeth 17. With fitting 10 fully inserted as in FIG. 9, cable 25 is firmly locked in channel 27 as shown; the section view is offset at the divider in FIG. 9 such that first channel 26 and first cable 24 are not shown in this view (see FIGS. 10 and 11). Tapered wire entry 35 facilitates insertion of wire into the fitting 10 and avoids wear caused by sharp edges.

In use, the arms 23, 78 may be inserted partially through an aperture or knockout 34 in enclosure panel 28 (see also FIGS. 9-11). Upon insertion, the tapered or sloped insertion faces 29 of arm 23 lips 19 facilitate easy entry of the arms 23, 78 into the enclosure 28 through knockout aperture 34. Details of the arms 23, 78 can be seen in FIG. 3. The arms 23, 78 are generally of the same material as the housing 11; being cantilevered, they flex to permit entry into the enclosure 28 to a first or staging position (illustrated in FIG. 10) from which the device 10 cannot easily be withdrawn; lip 19 stop face 13, abutting the enclosure 28, prevents such withdrawal.

The view of the device shown in FIG. 10 specifically illustrates insertion of fitting 10 to the first, or staging position. Behind lip 19 stop face 13 along the length of arm 23 is a first external face portion 20, which may preferably be arcuate; this first face portion 20 is thus adapted for fitting the inside of the knockout aperture 34 and should preferably be greater in length than the expected thickness of the enclosure 28 wall at knockout 34. Following this first face portion 20 along the arm 23 towards the housing 11 is an outwardly inclined arcuate ramp or intermediate face portion 21, followed by a shorter inwardly inclined arcuate ramp portion 22, which for the present preferred embodiment illustrated, is preferably at least as long as the enclosure 28 wall is thick. Lip 49 portion of arm 23 (see FIGS. 10 and 11) provides an additional stop for preventing insertion beyond flange 43. Lip 33 on arm 78 functions similarly. A plurality of retaining teeth 52, 57, 82, 83 are spaced from the housing 11 by a gap illustrated best by undercut or notch 55 of FIG. 3. The dimension of the notch should be equal to or greater than the thickness of the enclosure 28 wall at the knockout 34 location.

As arms 23, 78 are inserted further into enclosure 28, inward inclined ramp portion 22 is compressed until it is approximately of the same outer diameter as the inner diameter of the knockout 34. The retaining teeth 52, 57, 82, 83 are shaped to extend to a diameter greater than that of the knockout 34. They may be partially cantilevered or undercut and tapered as shown in this example, from the insertion end towards the main housing end of the fitting 10 to ease insertion flexure and locking. It is expected that fitting 10 must ordinarily be at least slightly forced the remaining distance into the enclosure 28 knockout aperture 34. Housing 11 is provided with an at least partial circumferential flange 43 to prevent housing 11 from being forced through knockout 34 into the enclosure 28. This lip 43 may be an integral or separate part of housing 11. The final forced insertion of the fitting 10 into the enclosure 28 knockout 34 may require manually applied force, as by striking the fitting 10 with a small hammer. The slight hammering force may be applied directly or via a screwdriver or other tool.

One or more dividers 18 may be included within the central passageway 31 to divide passageway 31 into discrete channels 26, 27 for receiving the wires or cables 24, 25. In the present illustrative embodiment a single divider 18 is shown, forming two channels 26, 27 through which cables 24, 25 have been inserted. Here, divider 18 is rounded at the distal wire entry end 14 to facilitate cable 24, 25 insertion. The proximal wire exit end 15 of divider 18 is terminated to form an anvil 32 approximately opposite toothed gripper portion 17 of arms 23, 78. As the fitting 10 is inserted via arms 23, 78 into the enclosure 28 aperture 34, the enclosure knockout 34 diameter forces arms 23, 78 inward in the manner of a fulcrum such that the toothed gripper portion 17 is forced firmly into contact with the divider 18 at terminating anvil 32. The cable 25 is thereby firmly and forcibly compressed by the fulcrum action between gripper teeth 17 and anvil 32. For this reason, it is preferable that the housing 11, gripper teeth 17, and anvil 32 be of an electrically non-conductive material. Numerous commercially available plastics, including Underwriters' Laboratories Section 94-1 approved polyesters and polyolefins, including polyethylene and polypropylene are suitable. These materials may be easily molded into the complex shape required for fitting 10. Note that the fitting may also be inserted fully into the enclosure mounting hole, then the cables inserted. It is further preferable that the dimensions of the fitting 10 arms 23, 78 gripper 17, elements of divider 18 and anvil portion 32 be selected to enable firm compression of the cables 24, 25 without damaging same, and further that these dimensions be selected to meet this compression limitation for a range of cable thicknesses and cable sizes, giving due regard to the manufacturing tolerances inherent in the manufacture of the enclosure 28 knockout 34 diameters, cable 24, 25 size variations, and of the fitting 10.

In use, cables 24, 25 are brought through a knockout or aperture 34 in enclosure panel 28 and both installed through and mechanically fastened to panel 28 to guard against unintentional removal of the wires or cables 24, 25. Here, each cable is passed via a separate channel 26, 27 in fitting 10 into the box or enclosure 28. The cable is secured to the fitting 10 between inward directed gripping teeth (not shown in FIG. 8) on arms 23, 78 and terminating anvil 32 of divider 18. The fitting, in turn, is secured to box or panel 28 by a plurality of positive locking teeth such as teeth 52, 57, 82, 83. Sloping faces 51, 56, 84, 85 facilitate resilient entry of fitting 10 into the enclosure 28, enabling it to be locked it in place, and assuring that it cannot readily be withdrawn.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:

1. A fitting for securing cable and the like to an enclosure, comprising:
   (a) housing means having a passageway therethrough, for enclosing the cable;
   (b) means for longitudinally dividing said passageway into a plurality of channels, said channels being adapted for receiving at least one cable each, said means for longitudinally dividing said passageway having a rounded entry end and providing a cable clamp point at a second end thereof; and
   (c) means for securing said fitting to said enclosure comprising combination positive mechanical cable clamp adapted for both securing said fitting to said enclosure and for clamping said cables in said housing in cooperation with said cable clamp point.

2. The fitting according to claim 1, wherein said housing means is generally tubular.

3. The fitting according to claim 1, wherein said passageway is divided into at least two longitudinal channels.

4. The fitting according to claim 1, wherein said longitudinal channels are of equal cross-sectional area.

5. The fitting according to claim 1, wherein said longitudinal channels are of unequal cross-sectional area.

6. The fitting according to claim 1, wherein a plurality of electrical cables are received in the respective channels, and said cables are of unequal cross-sectional area.

7. The fitting of claim 1, wherein said fitting is made of an electrically insulative material.

8. The fitting according to claim 7, wherein said electrically insulative material is a polymer selected from the group including polyesters and polyolefins.

9. The fitting according to claim 7, wherein said electrically insulative material is selected from the group of polymers including polyethylenes and polypropylenes.

10. The fitting according to claim 1 for securing an electrical cable to an enclosure, wherein the enclosure includes an aperture and said fitting is adapted for insertion through said aperture, said means for securing said fitting further including a plurality of housing extensions terminating in radially outward projecting tabs.

11. The fitting according to claim 10, wherein the outer diameter of said tabs is greater than the diameter of the enclosure aperture.

12. The fitting according to claim 10, wherein said plurality of tabs includes a first group of tabs adapted for securing said fitting within the enclosure at a first insertion depth, and a second group of tabs adapted for securing said fitting within the enclosure at a second depth.

13. A cable fitting for securing electrical cable to an enclosure having an entry aperture, comprising:
   (a) generally tubular housing means having a longitudinal passageway therethrough, for protecting the cable;
   (b) clamp anvil means for dividing said passageway into a plurality of longitudinal channels, each of said channels being adapted for receiving at least one cable; and
   (c) combination cable clamp means for both positive mechanical securing of said cables within said housing against said clamp anvil and for securing said housing to said enclosure, said combination clamp means further including a plurality of separate first enclosure attachment tab means and a plurality of separate insertion stops, and respective inclined housing extension means joining each of said first enclosure attachment means to a respective insertion stop, wherein the outer diameter of said tabs is greater than the diameter of the enclosure aperture.

14. The cable fitting according to claim 13, wherein said channels are of unequal cross-sectional area.

15. The cable fitting according to claim 13, wherein said longitudinal passageway is divided into at least two channels.

16. The cable fitting according to claim 15, wherein said channels are of equal cross-sectional area.

17. The cable fitting of claim 13, wherein said cable fitting is made of an electrically insulative material.

18. The cable fitting according to claim 17, wherein said electrically insulative material is a polymer selected from the group including polyesters and polyolefins.

19. The cable fitting according to claim 17, wherein said electrically insulative material is selected from the group of polymers including polyethylenes and polypropylenes.

20. A fitting for securing nonmetallic sheathed cables to and through an electrical box or a panel enclosure, comprising:
(a) a unitary, generally tubular spool-like element including therein a passageway for receiving at least one nonmetallic cable;
(b) a centrally disposed cable clamp anvil and longitudinal passageway divider within said passageway;
(c) at least one panel entry element hingedly mounted to said spool-like element and having an exterior tapered shoulder extending longitudinally from the exterior of said tubular element and an interior row of transverse teeth;
(d) at least one cable; and
(e) flange means surrounding said tubular element for limiting the depth to which the fitting may be inserted into said box or panel;
wherein insertion of the panel entry element into said enclosure permits insertion of said at least one cable through the longitudinal passageway on one or both sides of said cable clamp anvil and longitudinal passageway divider in the entry direction, and insertion of the fitting past the shoulder to the limiting flange accompanies compression of the panel entry element by a camming action with said teeth into gripping position relative said cable with said divider acting as a gripper anvil to form a positive mechanical clamp therebetween.

21. Fitting for mechanically coupling a cable through an enclosure wall, comprising:
(a) a housing for enclosing the cable, said housing having a longitudinal passageway therethrough;
(b) at least one divider means for longitudinally dividing said passageway into a plurality of channels, said divider means having a rounded entry end and providing a cable clamp point at a second end thereof, each of said channels being adapted for receiving at least one cable each; and
(c) at least two articulable arms extending from said housing and forming both cooperating means for clamping said cable against said divider and cable clamp point within said housing and means for securing said fitting to said enclosure.

22. The fitting according to claim 21, wherein said housing is generally spool-shaped and at least one end includes a radially extending rim.

23. The fitting according to claim 22, wherein said cooperating means for securing said fitting to said enclosure and clamping said cable within said fitting comprise a plurality of resiliently cantilevered housing extension members terminated with radially outward projecting tabs.

24. The fitting according to claim 23, wherein said housing extension members include internal gripping means for engaging said cable.

* * * * *